United States Patent
Song

(10) Patent No.: US 9,679,509 B2
(45) Date of Patent: Jun. 13, 2017

(54) POSITIVE FEEDBACK ENHANCED SWITCHING EQUALIZER WITH OUTPUT POLE TUNING

(71) Applicant: SAMSUNG DISPLAY CO., LTD., Yongin, Gyeonggi-Do (KR)

(72) Inventor: Sanquan Song, Mountain View, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 210 days.

(21) Appl. No.: 14/599,421

(22) Filed: Jan. 16, 2015

(65) Prior Publication Data
US 2015/0319020 A1 Nov. 5, 2015

Related U.S. Application Data

(60) Provisional application No. 61/987,404, filed on May 1, 2014.

(51) Int. Cl.
*G09G 3/20* (2006.01)
*H04L 25/03* (2006.01)
*H04L 27/01* (2006.01)

(52) U.S. Cl.
CPC ............ *G09G 3/20* (2013.01); *H04L 25/03* (2013.01); *H04L 25/03949* (2013.01);
(Continued)

(58) Field of Classification Search
CPC ........... H04L 25/0272; H04L 25/03885; H04L 25/028; H04L 2025/0349; H04L 2027/004; H04L 25/03019; H04L 27/01
(Continued)

(56) References Cited

U.S. PATENT DOCUMENTS 5,180,932 A * 1/1993 Bengel ................ G11C 27/026
327/362
5,856,758 A * 1/1999 Joffe ........................ H03F 1/32
330/103
(Continued)

FOREIGN PATENT DOCUMENTS

KR 10-1019854 1/2009
KR 10-2012-0053466 A 5/2012
(Continued)

OTHER PUBLICATIONS

Korean Publication No. 10-2009-0005223 A published Jan. 12, 2009 which corresponds to KR Registration No. 10-1019854 as set forth above.

*Primary Examiner* — Emmanuel Bayard
(74) *Attorney, Agent, or Firm* — Lewis Roca Rothgerber Christie LLP

(57) ABSTRACT

A switched equalizer for equalizing the frequency response of a channel with high-frequency attenuation. In one embodiment the differential input of the equalizer is fed to a switch that interchanges the complementary signals at the differential input, changing the sign of the received signal, at each transition of a clock at the Nyquist frequency. The switched signal is filtered by a low-pass filter with positive feedback enhancement at DC gain and digitized by a sense amplifier, and the digital output of the sense amplifier is inverted during every half-cycle of clock at the Nyquist frequency, restoring the sign of the input signal.

16 Claims, 7 Drawing Sheets

(52) U.S. Cl.
CPC ......... *H04L 27/01* (2013.01); *G09G 2370/08* (2013.01); *G09G 2370/14* (2013.01)

(58) Field of Classification Search
USPC .................................................. 375/229–332
See application file for complete search history.

(56) References Cited

U.S. PATENT DOCUMENTS

| | | | | |
|---|---|---|---|---|
| 6,002,299 A * | 12/1999 | Thomsen | ................. | H03F 1/083 330/107 |
| 6,369,650 B1 * | 4/2002 | Hayat-Dawoodi | .... | H04B 1/583 330/146 |
| 6,437,608 B1 * | 8/2002 | Miyabe | ................. | G11C 27/026 327/337 |
| 6,493,404 B1 * | 12/2002 | Iizuka | ................. | G06F 17/15 375/142 |
| 6,697,444 B1 * | 2/2004 | Iizuka | ................. | G06F 17/15 375/142 |
| 6,724,248 B2 * | 4/2004 | Llewellyn | ................. | H03F 1/02 327/124 |
| 6,888,481 B2 * | 5/2005 | Itoh | ................. | H03M 1/1019 341/118 |
| 6,937,174 B2 * | 8/2005 | Higashi | ................. | G11C 27/02 341/122 |
| 7,180,354 B2 * | 2/2007 | Gabillard | ............ | H03F 3/45775 327/307 |
| 7,183,811 B2 * | 2/2007 | Horie | ................. | H03K 5/249 327/63 |
| 7,498,875 B2 * | 3/2009 | Forbes | ................. | H03F 1/26 327/124 |
| 7,564,296 B2 * | 7/2009 | Ito | ................. | H03K 19/00384 323/312 |
| 7,567,196 B2 * | 7/2009 | Boemler | ................. | H03M 1/46 341/144 |
| 7,656,981 B2 * | 2/2010 | Stojanovic | ............ | H04L 25/028 326/38 |
| 7,714,601 B2 * | 5/2010 | Ito | ................. | G01R 31/2621 324/762.01 |
| 7,795,958 B2 * | 9/2010 | Agarwal | ................. | H03F 3/005 330/9 |
| 7,816,936 B2 * | 10/2010 | Ito | ................. | G01R 31/2621 324/750.3 |
| 7,816,992 B2 * | 10/2010 | Tanaka | ................. | H03F 3/217 330/260 |
| 7,911,263 B2 * | 3/2011 | Guo | ................. | H03K 17/0822 324/522 |
| 7,924,089 B2 * | 4/2011 | Tanaka | ................. | H03F 3/217 330/10 |
| 7,994,782 B2 * | 8/2011 | Takeda | ................. | G01R 33/07 324/244 |
| 7,994,842 B2 * | 8/2011 | Ito | ................. | H03K 19/00384 327/534 |
| 8,004,346 B2 * | 8/2011 | Ito | ................. | H03K 19/00384 323/312 |
| 8,125,620 B2 * | 2/2012 | Lewis | ................. | G01S 7/4811 356/5.01 |
| 8,264,266 B2 * | 9/2012 | Dowlatabadi | ............. | G04F 5/00 327/291 |
| 8,310,276 B2 * | 11/2012 | Onuki | ................. | H04L 25/0278 326/81 |
| 8,344,797 B2 * | 1/2013 | Crespi | ................. | H03F 3/45986 330/9 |
| 8,693,557 B1 * | 4/2014 | Zhang | ................. | H04L 25/0266 375/259 |
| 8,847,169 B2 * | 9/2014 | Yuan | ................. | G01T 1/247 250/370.08 |
| 9,219,414 B2 * | 12/2015 | Shao | ................. | H02M 3/158 |
| 9,231,791 B2 * | 1/2016 | Onuki | ................. | H04L 25/0278 |
| 9,385,740 B2 * | 7/2016 | Wang | ................. | H03M 1/0854 |
| 9,413,317 B2 * | 8/2016 | Kropfitsch | ............. | H03G 3/002 |
| 2004/0086036 A1 * | 5/2004 | Eckhardt | ............. | H03H 17/0294 375/233 |
| 2004/0140920 A1 * | 7/2004 | Ito | ................. | H03M 1/1019 341/118 |
| 2004/0252037 A1 * | 12/2004 | Itoh | ................. | H03M 1/1019 341/118 |
| 2005/0238014 A1 * | 10/2005 | Kang | ................. | H03F 1/0205 370/389 |
| 2006/0007029 A1 * | 1/2006 | Ito | ................. | H03M 1/0607 341/144 |
| 2008/0211318 A1 * | 9/2008 | Wang | ................. | H01H 47/325 307/130 |
| 2009/0304092 A1 * | 12/2009 | Takemoto | ................. | H03F 3/24 375/257 |
| 2010/0259285 A1 * | 10/2010 | Koli | ................. | G01P 15/125 324/686 |
| 2011/0205099 A1 * | 8/2011 | Inoue | ................. | H03K 5/24 341/158 |
| 2012/0287345 A1 * | 11/2012 | Lien | ................. | H04N 7/108 348/723 |
| 2014/0001815 A1 * | 1/2014 | Tanaka | ................. | H02P 7/0094 297/463.1 |
| 2015/0260831 A1 * | 9/2015 | Lewis | ................. | G01S 7/4865 356/4.01 |

FOREIGN PATENT DOCUMENTS

| | | |
|---|---|---|
| KR | 10-2013-0019353 A | 2/2013 |
| WO | WO 2013/137911 A1 | 9/2013 |

* cited by examiner

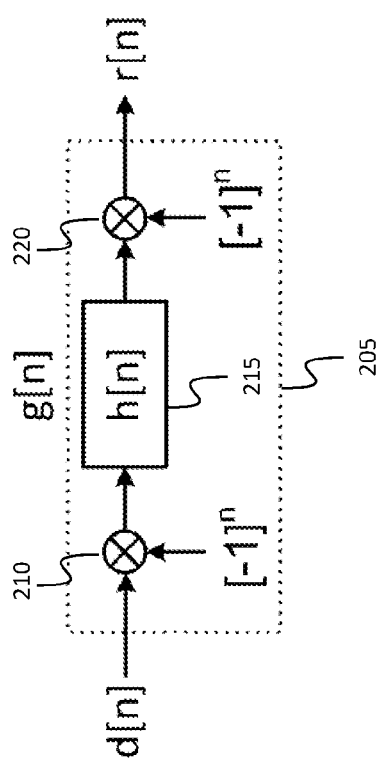
FIG. 2A
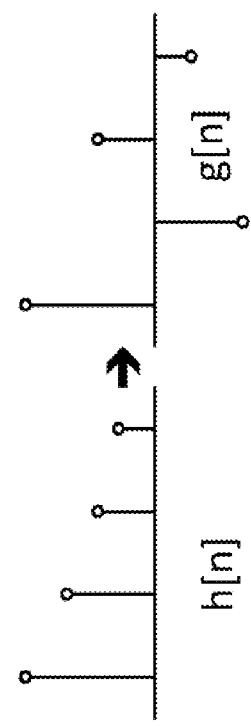
FIG. 2B
FIG. 2C

POSITIVE FEEDBACK ENHANCED SWITCHING EQUALIZER WITH OUTPUT POLE TUNING

CROSS-REFERENCE TO RELATED APPLICATION(S)

The present application claims priority to and the benefit of Provisional Application No. 61/987,404, filed May 1, 2014, entitled "POSITIVE FEEDBACK ENHANCED SWITCHING EQUALIZER WITH OUTPUT POLE TUNING", the entire content of which is incorporated herein by reference.

FIELD

One or more aspects of embodiments according to the present invention relate to digital data transmission and more particularly to a system and method for data transmission through a channel with a non-uniform frequency response.

BACKGROUND

In systems for transmitting digital data through an imperfect channel, e.g., a channel with higher loss at high frequencies than at low frequencies, changes in the digital waveform upon transmission through the channel may result in data errors. Techniques such as the use of a receiver continuous time linear equalizer or of a decision feedback equalizer may be used to correct for high frequency loss in a channel, or for other changes in the waveform resulting from transmission through a non-ideal channel.

These techniques have various disadvantages such as high power consumption, as in the case of a continuous time linear equalizer, in which explicit peaking at the Nyquist frequency requires additional power. Moreover, the filter may consume a significant amount of area, e.g., on an integrated circuit chip.

Thus, there is a need for a simple, low-power system and method for providing equalization for an imperfect channel.

SUMMARY

Aspects of embodiments of the present disclosure are directed toward a switched equalizer for equalizing the frequency response of a channel with high-frequency attenuation. In one embodiment the differential input of the equalizer is fed to a switch that interchanges the complementary signals at the differential input, changing the sign of the received signal, at each transition of a clock at the Nyquist frequency. The switched signal is filtered by a low-pass filter, with positive feedback enhancement at DC gain and output pole tuning, and digitized by a sense amplifier, and the digital output of the sense amplifier is inverted during every half-cycle of a clock at the Nyquist frequency, restoring the sign of the input signal.

According to an embodiment of the present invention there is provided a system for equalizing a data transmission channel, the system having an input and an output and including: a first switch connected to the input; a low-pass filter connected to the first switch, the low-pass filter including an amplifier with positive feedback; a clocked comparator connected to the low-pass filter; and a switched inverter connected to the clocked comparator, and to receive a digital signal and to selectively output the digital signal or the inverse of the digital signal.

In one embodiment, the first switch is to operate in either a first state or a second state.

In one embodiment, the first switch is to receive a differential signal carried on a first conductor and a second conductor.

In one embodiment, the first switch is to transmit, to the low-pass filter, a differential signal carried on a third conductor and a fourth conductor.

In one embodiment, in the first switch, in the first state: the first conductor is connected to the third conductor, and the second conductor is connected to the fourth conductor, and in the second state: the first conductor is connected to the fourth conductor, and the second conductor is connected to the third conductor.

In one embodiment, the switched inverter includes: a switched inverter input, a switched inverter output, a first inverter connected to the switched inverter input, and a single-pole double-throw (SPDT) switch connected to: the switched inverter input, the output of the first inverter, and the switched inverter output.

In one embodiment, the SPDT switch includes a common terminal, a first switched terminal, and a second switched terminal, and the first switched terminal of the SPDT switch is connected to the switched inverter input, the second switched terminal of the SPDT switch is connected to an output of the first inverter, and the common terminal of the SPDT switch is connected to the switched inverter output.

In one embodiment, the system includes a plurality of transistors.

In one embodiment, the system includes a first transistor, a second transistor, a differential input, and a differential output; each of the first and second transistors including: a first current-carrying terminal, a control terminal, and a second current-carrying terminal; the differential input including: a first conductor connected to the control terminal of the first transistor, and a second conductor connected to the control terminal of the second transistor; and the differential output including: a first conductor connected to the first current-carrying terminal of the first transistor, and a second conductor connected to the first current-carrying terminal of the second transistor.

In one embodiment, the system includes: a first current-carrying terminal, a control terminal, and a second current-carrying terminal; the third transistor connected in series between the first current-carrying terminal of the first transistor and a positive voltage supply; and the fourth transistor connected in series between the first current-carrying terminal of the second transistor and the positive voltage supply.

In one embodiment, the control terminal of the third transistor is connected to the first current-carrying terminal of the second transistor, and the control terminal of the fourth transistor is connected to the first current-carrying terminal of the first transistor.

In one embodiment, the system includes: a first programmable resistor connected between: the first current-carrying terminal of the first transistor and the positive voltage supply; a second programmable resistor connected between: the first current-carrying terminal of the second transistor and the positive voltage supply; a first programmable capacitor connected between: the first current-carrying terminal of the first transistor and a ground connection; and a second programmable capacitor connected between: the first current-carrying terminal of the second transistor and the ground connection.

In one embodiment, the first transistor, the second transistor, the third transistor, and the fourth transistor are field-effect transistors (FETs).

In one embodiment, a display includes: a timing controller; a driver integrated circuit (IC); and a serial data link connecting the timing controller and the driver IC, the driver IC including a system for equalizing a data transmission channel.

In one embodiment, the display is an organic light emitting diode (OLED) display or a liquid crystal display (LCD).

BRIEF DESCRIPTION OF THE DRAWINGS

Features, aspects, and embodiments are described in conjunction with the attached drawings, in which:

FIG. 2A is a block diagram illustrating the discrete time domain conversion of a low-pass filter to a high-pass filter according to an embodiment of the present invention;

FIG. 2B is an illustration of the discrete time impulse response of a low-pass filter according to an embodiment of the present invention;

FIG. 2C is an illustration of the discrete time impulse response of a high-pass filter according to an embodiment of the present invention;

DETAILED DESCRIPTION

Figure 1A:
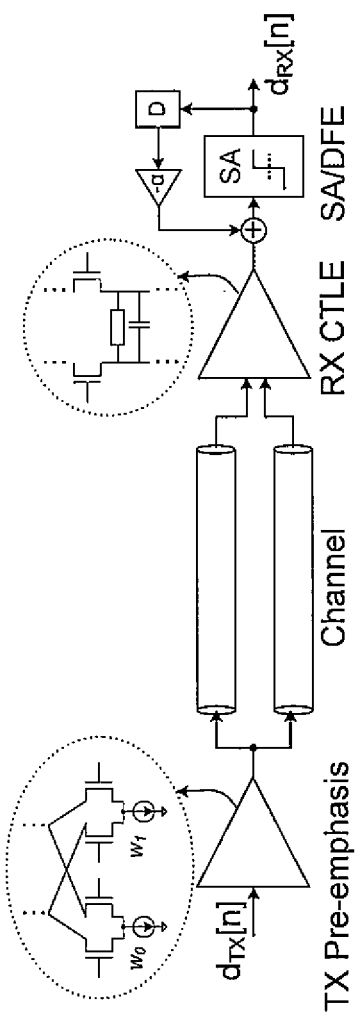
FIG. 1A is a diagram illustrating an architecture of a high-speed link, including transmitter equalization and receiver equalization.

The detailed description set forth below in connection with the appended drawings is intended as a description of exemplary embodiments of a positive feedback enhanced switching equalizer with output pole tuning provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention.

As denoted elsewhere herein, like element numbers are intended to indicate like elements or features. Expressions such as "at least one of," when preceding a list of elements, modify the entire list of elements and do not modify the individual elements of the list. It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Further, the use of "may" when describing embodiments of the inventive concept refers to "one or more embodiments of the present invention." Also, the term "exemplary" is intended to refer to an example or illustration.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on," "directly connected to", "directly coupled to", or "immediately adjacent to" another element or layer, there are no intervening elements or layers present.

As will be understood by one of skill in the art, an input or output of a component may be a single conductor carrying a signal represented as a voltage with respect to ground, or it may be a differential input or output including a pair of conductors carrying complementary signals. A connection shown in the drawings as a single line may represent more than one conductor, carrying, for example, a differential signal composed of a signal and its complement.

Figure 1B:
FIG. 1B includes a sequence of frequency domain graphs each showing the frequency response of a respective block of the diagram of FIG. 1A, and the product of the frequency response of all of the blocks.
Figure 1C:
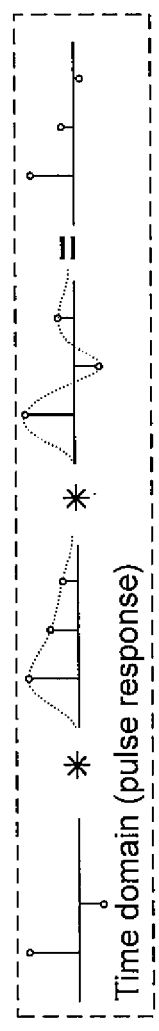
FIG. 1C includes a sequence of time domain graphs each showing the impulse response of a respective block of the diagram of FIG. 1A, and the impulse response of the cascade of all of the blocks.

Electrical channels for transmitting high-speed serial digital data may provide a non-uniform frequency response, e.g., the attenuation of high-frequency components of the signal transmitted through the channel may be greater than the attenuation of low-frequency signals. A data sequence when transmitted into the channel may be composed of ones and zeros represented as two different levels (e.g., voltages or currents), a first level and a second level, with sharp transitions between. These levels may be provided at the input of the channel by a transmitter (TX) and updated at a rate referred to herein as the data rate, or twice the Nyquist frequency. The non-uniform frequency response of the channel may result in an altered waveform, lacking sharp transitions or well-defined levels, being received. This may cause errors in a receiving circuit designed to recover the data sequence. Referring to FIG. 1A, related art approaches to mitigating this problem include transmitter (TX) pre-emphasis, e.g., preferentially amplifying the high-frequency components of the signal before transmission, the use of a receiver continuous time linear equalizer (CTLE) to provide gain ("peaking") at frequencies near the Nyquist frequency, and the use of a sense amplifier with a decision feedback equalizer (SA/DFE). FIG. 1B shows the effects of these blocks in the frequency domain, and FIG. 1C shows their effect in the time domain.

In one embodiment, a high-pass may be constructed from a low-pass filter utilizing two multiplications. Referring to FIG. 2A, a filter 205 with impulse response g[n], composed of a first multiplier 210, a filter 215 with impulse response h[n] and a second multiplier 220, has an impulse response that may be derived as follows:

$$r[n] = ((d[n] \times [-1]^n) * h[n]) \times [-1]^n$$
$$= (\sum_{k=-\infty}^{+\infty} d[n-k] \times ([-1]^{n-k} \times h[k])[-1]^n$$
$$= \sum_{k=-\infty}^{+\infty} d[n-k] \times ([-1]^{n-k} \times h[k])$$
$$= d[n] * ([-1]^n \times h[n])$$
$$= d[n] * g[n],$$

where $$g[n] = [-1]^n \times h[n].$$

Thus, if the filter 215 is a high-pass filter, then the filter 205 will be a low-pass filter, and if the filter 215 is a low-pass filter, e.g., a filter with the impulse response h[n] shown in FIG. 2B, then the filter 205 will be a high-pass filter, with the impulse response g[n] shown in FIG. 2C.

Figures 3A, 3B, 3C, 3D, 3E:
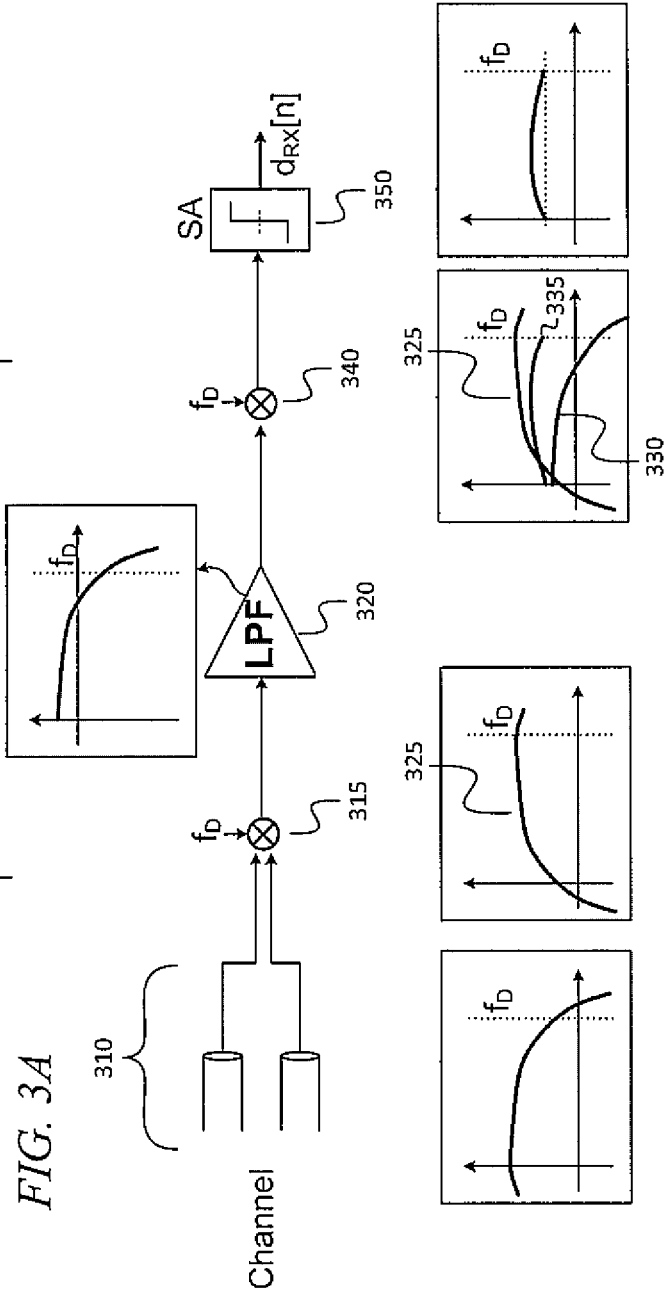
FIG. 3A is a block diagram illustrating, in the continuous time domain, the conversion of a low-pass filter to a high-pass filter according to an embodiment of the present invention.
FIG. 3B is a graph of the frequency response of a channel with increased loss at high frequencies.
FIG. 3C is a graph of the frequency response of FIG. 3B after multiplication by a signal at the Nyquist frequency, according to an embodiment of the present invention.
FIG. 3D is a graph of the frequency response of FIG. 3B after multiplication by a signal at the Nyquist frequency, and of transfer function of a low-pass filter, and of the product of the two, according to an embodiment of the present invention.
FIG. 3E is a graph of the frequency response of the cascade of a channel and an equalizer, according to an embodiment of the present invention.

Referring to FIG. 3A, a similar continuous-time circuit also may be utilized to convert a low-pass filter to a high-pass filter. In this circuit the signal received from a channel 310 is first multiplied, utilizing a first multiplier 315, by a sinusoidal signal at the Nyquist frequency $f_D$. The signal received from the channel has attenuated high frequency content as illustrated in FIG. 3B, and the first multiplication flips the signal content around $f_D$ in the frequency domain, resulting in a signal illustrated, in the frequency domain, by curve 325 in FIG. 3C. The flipped signal is then low-pass filtered by the filter 320. FIG. 3D shows three curves: a first curve 325, showing the signal at the output of the first multiplier, a second curve 330 showing the transfer function of the low-pass filter, and a third curve 335 showing their product. The output of the low-pass filter is multiplied again, utilizing a second multiplier 340, by a sinusoidal signal at the Nyquist frequency $f_D$, to restore the low and high frequency components of the received signal to their respective proper places in the spectrum, resulting in the signal illustrated, in the frequency domain, in FIG. 3E. Finally the signal is converted to a digital data stream by a sense amplifier 350, i.e., an amplifier which converts an analog signal to a digital signal. In another embodiment, the sense amplifier may, instead of following the second multiplier as illustrated in FIG. 3A, precede the second multiplier, and the second multiplier may then be implemented as a digital multiplier having a digital signal input and a digital signal output, in addition to an input for the signal at the Nyquist frequency. Such a digital multiplier has the effect of inverting the polarity of every other bit received.

Figure 4:
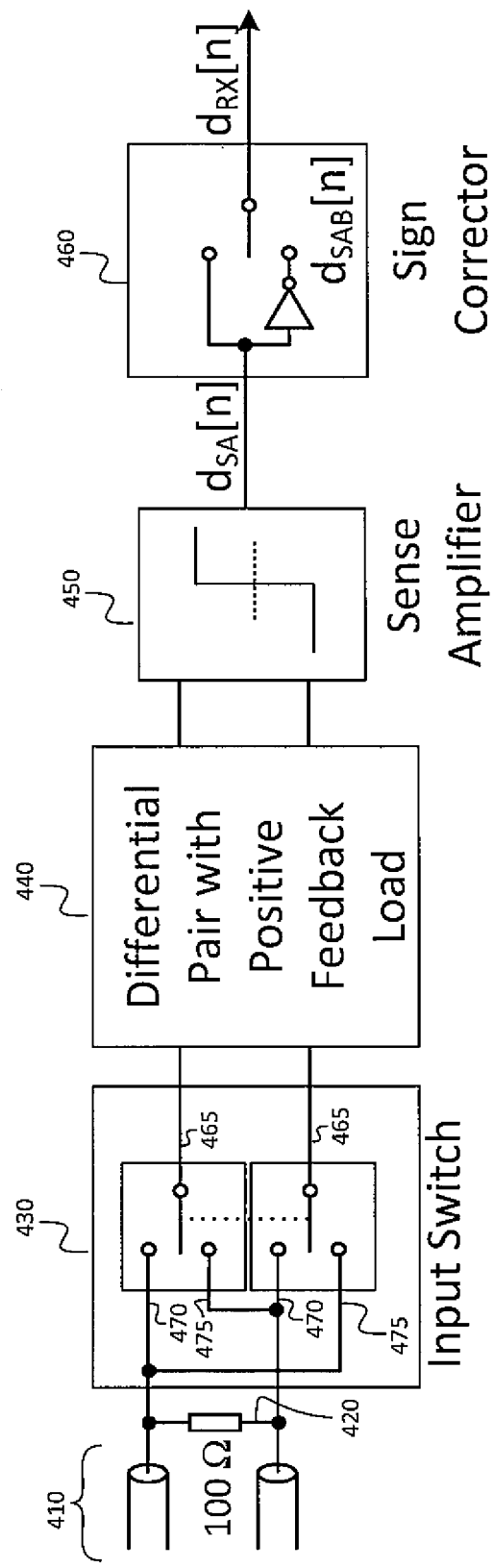
FIG. 4 is a block diagram illustrating a positive feedback enhanced switching equalizer according to an embodiment of the present invention.

Referring to FIG. 4, in one embodiment, the channel 410 is a balanced transmission line driven with a differential signal and terminated with a resistor 420 having a resistance substantially equal to the differential mode characteristic impedance of the transmission line, e.g., 100 ohms as shown. An input switch, or "first switch" 430 preserves or reverses, depending on the setting of the switch, the polarity of the signal, and feeds it to a low-pass filter, which may be implemented as a differential pair with a positive feedback load. The input switch is illustrated schematically in FIG. 4 as a suitably wired double-pole double-throw (DPDT) switch composed of two single-pole double-throw (SPDT) switches ganged together, each having a common terminal 465, a first switched terminal 470, and a second switched terminal 475.

In one embodiment, a first and a second conductor carry a differential signal to the input switch 430, and the input switch operates in two states. In the first state the first conductor is connected to a third conductor, and the second conductor is connected to a fourth conductor, and in the second state, the first conductor is connected to the fourth conductor, and the second conductor is connected to the third conductor. The third and fourth conductors then carry the switched differential signal from the input switch 430, e.g., to a low-pass filter 440.

As will be understood by one of skill in the art, functionality equivalent to that illustrated by the DPDT switch may be provided in practice by various circuits, e.g., transistor circuits. For example, each of the two SPDT switches that may be ganged to form a DPDT switch may be implemented with two n-channel field-effect transistors (FETs), the sources of the FETs connected together to form the common terminal 465 of the SPDT switch, and the drains of the FETs forming the first switched terminal 470, and the second switched terminal 475, respectively. The setting of the input switch is controlled by a clock signal at the Nyquist frequency; in the case of switch implementation utilizing two FETs, for example, the clock signal and its complement may be connected to the respective gates of the two FETs.

A low-pass filter 440 receives the switched differential signal from the input switch, and feeds a filtered differential signal to sense amplifier 450. Sense amplifier 450 converts the filtered signal from an analog signal to a digital signal, e.g., employing a comparator or a clocked comparator, a clocked comparator being a circuit with a digital output that is updated, at every rising clock edge or at every falling clock edge, to be (binary) one if the input exceeds a threshold and zero otherwise, or vice versa (i.e., zero if the input exceeds the threshold and one otherwise). The digital signal at the output of the sense amplifier ("$d_{SA}[n]$" in FIG. 4) is fed to a sign corrector 460 or "switched inverter", i.e., a digital multiplier that inverts alternate samples, to restore the proper data values. The sign corrector 460 has a data input, a data output and a control input. The sign corrector 460 outputs either the input signal or the inverse of the input signal, depending on the value at the control input. A switched inverter 460 may be implemented, for example, with a first inverter to invert the input signal and an SPDT switch, as illustrated in FIG. 4, which may be implemented as, or include, a multiplexer to select between the input signal and the inverted input signal. The multiplexer may be implemented with two tri-state inverters, with their outputs connected, and their control inputs wired so that at any time one of the tri-state inverters is in a high-impedance state, and the other is in a low-impedance state. The inputs of the tri-state inverters may be connected to the input of the circuit (i.e., the input of the switched inverter) and to the output of the first inverter, respectively.

Figure 5:
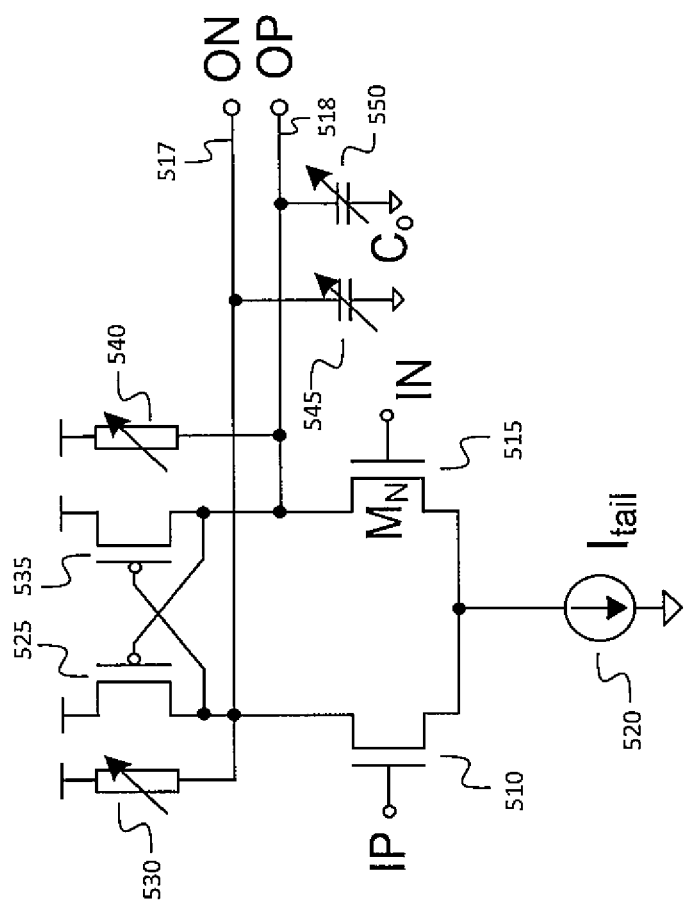
FIG. 5 is a schematic diagram of a low-pass filter with positive feedback enhancement according to an embodiment of the present invention.

Referring to FIG. 5, in one embodiment the low-pass filter 440 is fabricated as a differential amplifier with positive feedback. As used herein, an "amplifier with positive feedback" is an amplifier with a signal path forming a loop that includes a feedback path from the output to the input, the gain around the loop being positive at DC (i.e., in the limit as the frequency approaches zero). The differential amplifier includes a first field-effect transistor (FET) 510 and a second FET 515, arranged in a differential pair configuration, with the common node, or "tail" of the differential pair connected to a current source 520. The first and second FETs 510, 515 may be n-channel metal-oxide semiconductor FETs (MOSFETs), each having a drain, a source, and a gate. The source of each of the first and second FETs 510, 515 is connected to the current source 520. The drain of each of the first and second FETs 510, 515 is connected to a first output 517 and to a second output 518 of the differential amplifier, respectively, and, via a current path referred to herein as a load path, to a positive voltage supply. The load path of each of the FETs 510, 515 of the differential pair includes a FET and a resistor, connected in parallel. Thus, the load path of the first FET 510 contains a third FET 525 and a first resistor 530, connected in parallel, and the load path of the second FET 515 contains a fourth FET 535 and a second resistor 540, connected in parallel. The third and fourth FETs 525, 535 are p-channel MOSFETs, or "PMOS" transistors. The gate of the third FET 525 is connected to the drain of the second FET 515, and the gate of the fourth FET 535 is connected to the drain of the first FET 510. This connection of the gates of the third and fourth FETs 525, 535, which may be referred to as a cross-coupled PMOS configuration, provides positive feedback, which increases the low-frequency gain and direct current (DC) gain of the circuit. The DC gain of the low-pass filter may be arbitrarily large, or "infinite"; this results, because of the switches preceding and following the low-pass filter, in arbitrarily large equalization gain at the Nyquist frequency. Moreover, embodiments of the present invention tune the peaking frequency transfer curve through the resistors 530, 540 and capacitors 545, 550 of the differential pair's output node, producing a dominant pole, with the effect of providing infinite impulse response (IIR) filtering of the signal. The resistors 530, 540 may be fabricated as programmable resistors, for example, by implementing each as an array of transistors connected in parallel, so that as additional transistors of the array are turned on by respective control signals, the resistance of the parallel combination (i.e., of the programmable resistor) decreases. Similarly, the capacitors 545, 550 may be fabricated as programmable capacitors by forming each programmable capacitor as a parallel array of passive capacitor elements, each element connected to a node of the programmable capacitor through a switching transistor, so that when an additional switching transistor is turned on by a respective control signal, the capacitor element to which it is connected contributes to the total capacitance, increasing the capacitance of the programmable capacitor.

In other embodiments the transistors may be junction field effect transistors (JFETs) or other three-terminal devices such as bipolar junction transistors (BJTs). In the case of devices not having a source, gate, and drain, the terminal (e.g., the base of a BJT) corresponding to the gate of a FET may be referred to more generally as a control terminal and the terminals (e.g., the collector and emitter of a BJT) corresponding to the source and drain of a FET may be referred to more generally as a first current-carrying terminal and a second current-carrying terminal.

A first capacitor 545 and a second capacitor 550 are connected from the first output 517 and the second output 518, respectively, to ground; a first resistor 530 and a second resistor 540 are connected from the first output 517 and the second output 518, respectively, to the positive voltage supply. The resistors 530, 540 and the capacitors 545, 550 may be selected or adjusted to adjust the bandwidth of the low-pass filter. In one embodiment, the bandwidth of the low-pass filter is adjusted to be substantially equal to the bandwidth of the channel. The values of the resistors 530, 540 and of the capacitors 545, 550 may be selected at design time, if the characteristics of the channel with which the circuit is be utilized are known at that time, or they may be adjustable. In one embodiment these components 530, 540, 545, 550 are programmable, i.e., their values are controlled by respective control voltages or control currents, which are generated in a control circuit in accordance with digital parameter values stored in respective control registers. In this manner the dominant output pole of the circuit may be tuned, e.g., in a calibration procedure performed during fabrication of the circuit, or in operation.

Figure 6:
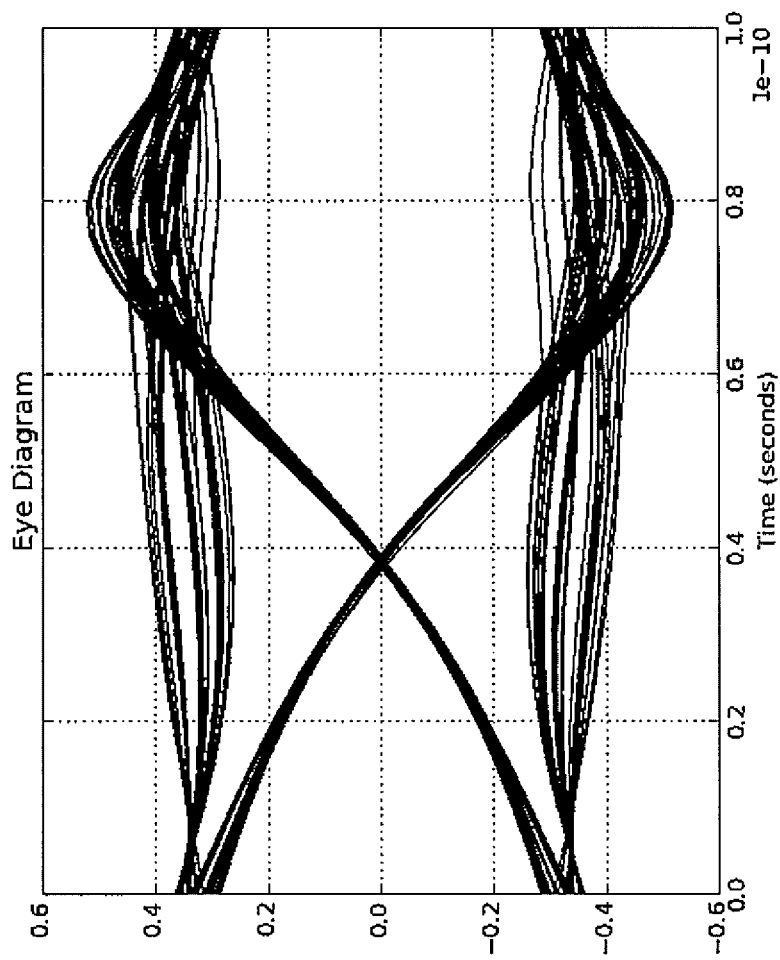
FIG. 6 is an eye diagram illustrating the simulated eye diagram of a channel with equalization according to an embodiment of the present invention.

FIG. 6 shows a simulated eye diagram generated by a circuit according to an embodiment of the present invention, connected to and configured to equalize the response of a channel with a loss of 17 dB at 5 GHz, where 5 GHz was utilized as the Nyquist frequency for the simulation. The eye diagram, which, in the absence of equalization, is closed at 10 Gbps, is, as shown in FIG. 6, wide open, resulting in good performance.

Figure 7:
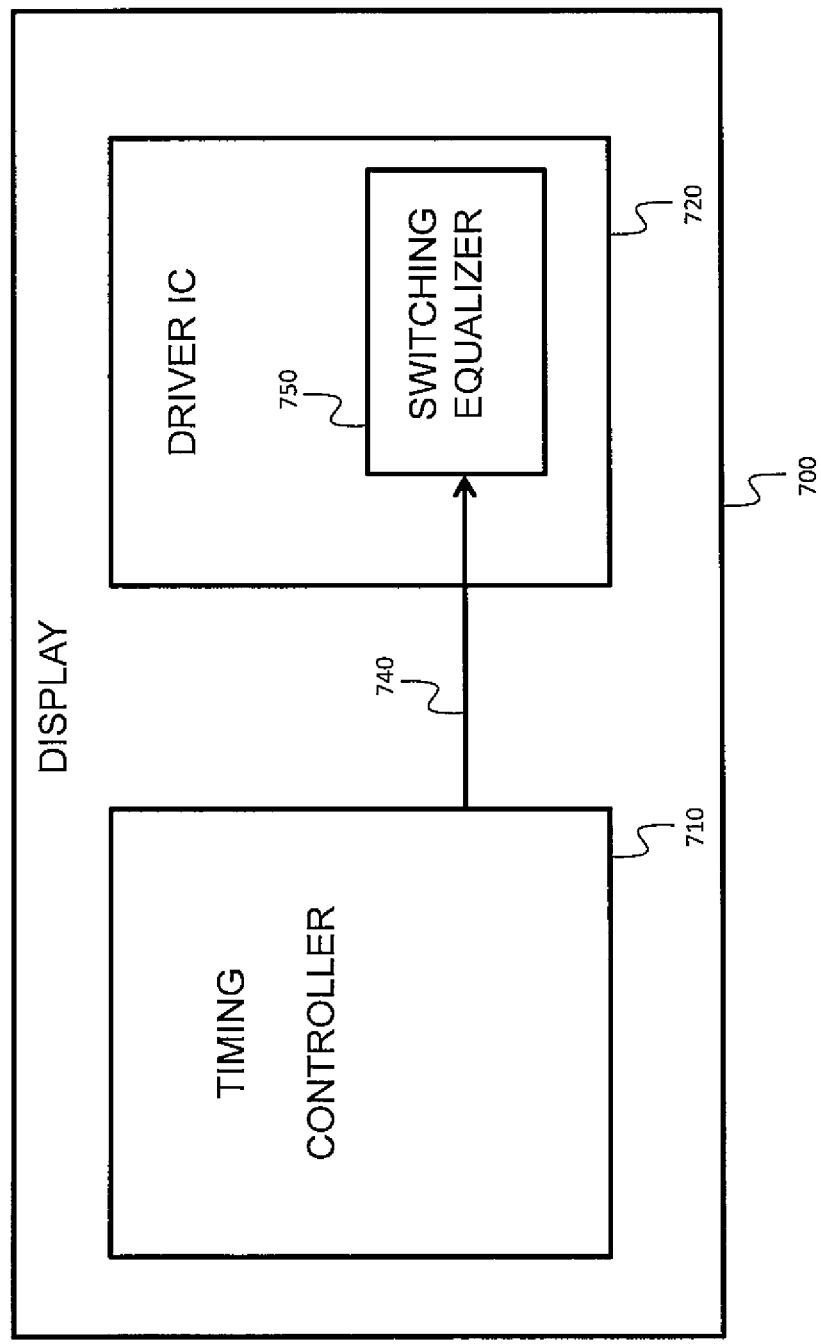
FIG. 7 is a block diagram of a display with an internal high-speed serial link and with a switching equalizer according to an embodiment of the present invention.

Referring to FIG. 7, in one embodiment a display 700 includes a timing controller 710 and a driver integrated circuit (IC) 720, and the timing controller 710 is configured to send high-speed serial data, on a serial data link including a data lane 740, to the driver IC 720. The driver IC receives the high-speed serial data in a circuit including a switching equalizer 750 constructed according to an embodiment of the present invention. Here, in embodiments of the present invention, the display is an organic light emitting diode (OLED) display or a liquid crystal display (LCD).

Although limited embodiments of a positive feedback enhanced switching equalizer with output pole tuning have been specifically described and illustrated herein, many modifications and variations will be apparent to those skilled in the art. Accordingly, it is to be understood that a positive feedback enhanced switching equalizer with output pole tuning employed according to principles of this invention may be embodied other than as specifically described herein. The invention is also defined in the following claims, and equivalents thereof.

What is claimed is:

1. A system for equalizing a data transmission channel, the system having an input and an output and comprising:
  a first switch connected to the input, the first switch being to preserve or reverse a polarity of a signal transmitted by the first switch, depending on a setting of the first switch;
  a low-pass filter electrically connected to the first switch, the low-pass filter comprising an amplifier with positive feedback;
a clocked comparator connected to the low-pass filter; and
a switched inverter connected to the clocked comparator, the switched inverter having a data input, a data output, and a control input, and the switched inverter being to receive a digital signal and to output the digital signal or the inverse of the digital signal, depending on a signal at the control input.

2. The system of claim 1, wherein the first switch is to operate in either a first state or a second state.

3. The system of claim 2, wherein the first switch is to receive a differential signal carried on a first conductor and a second conductor.

4. The system of claim 3, wherein the first switch is to transmit, to the low-pass filter, a differential signal carried on a third conductor and a fourth conductor.

5. The system of claim 4, wherein, in the first switch,
in the first state:
the first conductor is connected to the third conductor, and
the second conductor is connected to the fourth conductor, and
in the second state:
the first conductor is connected to the fourth conductor, and
the second conductor is connected to the third conductor.

6. The system of claim 1, wherein the switched inverter comprises:
a switched inverter input,
a switched inverter output,
a first inverter connected to the switched inverter input, and
a single-pole double-throw (SPDT) switch connected to:
the switched inverter input,
the output of the first inverter, and
the switched inverter output.

7. The system of claim 6, wherein the SPDT switch comprises a common terminal, a first switched terminal, and a second switched terminal, and
the first switched terminal of the SPDT switch is connected to the switched inverter input,
the second switched terminal of the SPDT switch is connected to an output of the first inverter, and
the common terminal of the SPDT switch is connected to the switched inverter output.

8. The system of claim 7, wherein the SPDT switch comprises a multiplexer comprising a plurality of transistors.

9. The system of claim 8, wherein the SPDT switch comprises two tri-state inverters,
each of the two tri-state inverters comprising a data input, a data output, and a control input,
the outputs of the two tri-state inverters forming the common terminal of the SPDT switch, and
the control inputs of the two tri-state inverters being connected such that a first one of the two tri-state inverters is in a high-impedance state when a second one of the two tri-state inverters is in a low-impedance state.

10. The system of claim 1, wherein the amplifier with positive feedback comprises a differential amplifier comprising a first transistor, a second transistor, a differential input, and a differential output;
each of the first and second transistors comprising:
a first current-carrying terminal,
a control terminal, and
a second current-carrying terminal;
the differential input comprising:
a first conductor connected to the control terminal of the first transistor, and
a second conductor connected to the control terminal of the second transistor; and
the differential output comprising:
a first conductor connected to the first current-carrying terminal of the first transistor, and
a second conductor connected to the first current-carrying terminal of the second transistor.

11. The system of claim 10, wherein the differential amplifier further comprises:
a third transistor and a fourth transistor, each of the third and fourth transistors comprising:
a first current-carrying terminal,
a control terminal, and
a second current-carrying terminal;
the third transistor connected in series between the first current-carrying terminal of the first transistor and a positive voltage supply; and
the fourth transistor connected in series between the first current-carrying terminal of the second transistor and the positive voltage supply.

12. The system of claim 11, wherein the control terminal of the third transistor is connected to the first current-carrying terminal of the second transistor, and the control terminal of the fourth transistor is connected to the first current-carrying terminal of the first transistor.

13. The system of claim 12, further comprising:
a first programmable resistor connected between:
the first current-carrying terminal of the first transistor and
the positive voltage supply;
a second programmable resistor connected between:
the first current-carrying terminal of the second transistor and
the positive voltage supply;
a first programmable capacitor connected between:
the first current-carrying terminal of the first transistor and
a ground connection; and
a second programmable capacitor connected between:
the first current-carrying terminal of the second transistor and
the ground connection.

14. The system of claim 11, wherein the first transistor, the second transistor, the third transistor, and the fourth transistor are field-effect transistors (FETs).

15. A display, comprising:
a timing controller;
a driver integrated circuit (IC); and
a serial data link connecting the timing controller and the driver IC,
the driver IC comprising the system of claim 1.

16. The display of claim 15, wherein the display is an organic light emitting diode (OLED) display or a liquid crystal display (LCD).

* * * * *